US010803610B2

(12) United States Patent
Zavesky et al.

(10) Patent No.: US 10,803,610 B2
(45) Date of Patent: Oct. 13, 2020

(54) COLLABORATIVE VISUAL ENHANCEMENT DEVICES

(71) Applicant: AT&T Intellectual Property I, L.P., Atlanta, GA (US)

(72) Inventors: Eric Zavesky, Austin, TX (US); Bo Han, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 291 days.

(21) Appl. No.: 15/913,700

(22) Filed: Mar. 6, 2018

(65) Prior Publication Data
US 2019/0279390 A1  Sep. 12, 2019

(51) Int. Cl.
G06K 9/00  (2006.01)
G06T 7/70  (2017.01)
G06T 7/50  (2017.01)
G06T 11/60  (2006.01)

(52) U.S. Cl.
CPC ............... *G06T 7/70* (2017.01); *G06T 7/50* (2017.01); *G06T 11/60* (2013.01)

(58) Field of Classification Search
CPC .............. G06T 7/70; G06T 7/50; G06T 11/60
USPC ....................................................... 382/103
See application file for complete search history.

(56) References Cited

U.S. PATENT DOCUMENTS

| 6,037,936 | A | 3/2000 | Ellenby et al. |
|---|---|---|---|
| 6,307,556 | B1 | 10/2001 | Ellenby et al. |
| 6,396,475 | B1 | 5/2002 | Ellenby et al. |
| 8,280,405 | B2 | 10/2012 | Sanz-Pastor et al. |
| 8,605,141 | B2 | 12/2013 | Dialameh et al. |
| 8,780,136 | B2 | 7/2014 | Mattila et al. |
| 9,071,709 | B2 | 6/2015 | Wither et al. |
| 9,607,438 | B2 | 3/2017 | Blanchflower et al. |
| 10,096,228 | B1 * | 10/2018 | Eulloqui ............ G06K 9/00892 |
| 10,475,249 | B2 * | 11/2019 | Holz ........................ G06F 3/00 |
| 2013/0258117 | A1 * | 10/2013 | Penov .................. G06K 9/6202 348/207.1 |
| 2018/0005442 | A1 | 1/2018 | Mullins | |

* cited by examiner

*Primary Examiner* — Jonathan S Lee

(57) ABSTRACT

A method may include a processing system including at least one processor detecting an object in a captured image, capturing features of the object, determining a location of a first device, and determining a bearing from the first device to the object. The processing system may further transmit the features of the object, the location of the first device, and the bearing from the first device to the object to a second device. Another method may include a processing system including at least one processor receiving, from a second device, features of an object, a location of the second device, and a bearing from the second device to the object. The processing system may further provide an assistance to orient the first device to view the object using the features of the object, the location of the second device, and the bearing from the second device to the object.

20 Claims, 5 Drawing Sheets

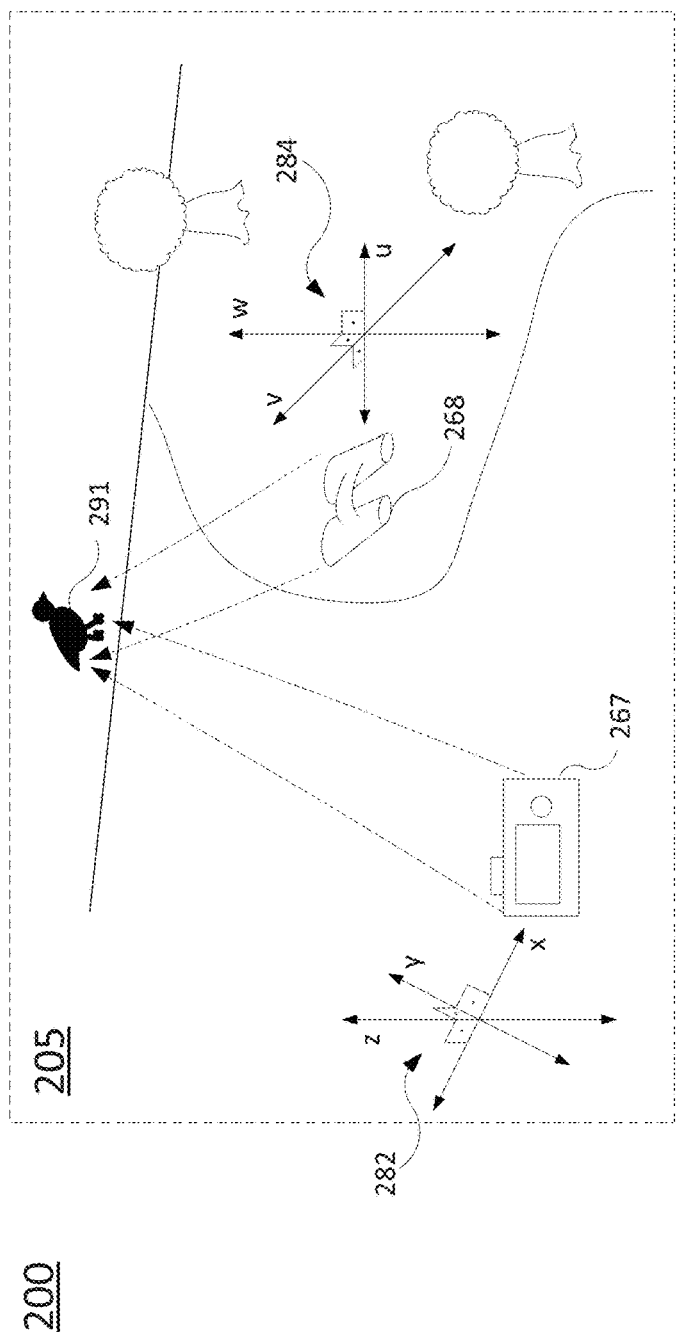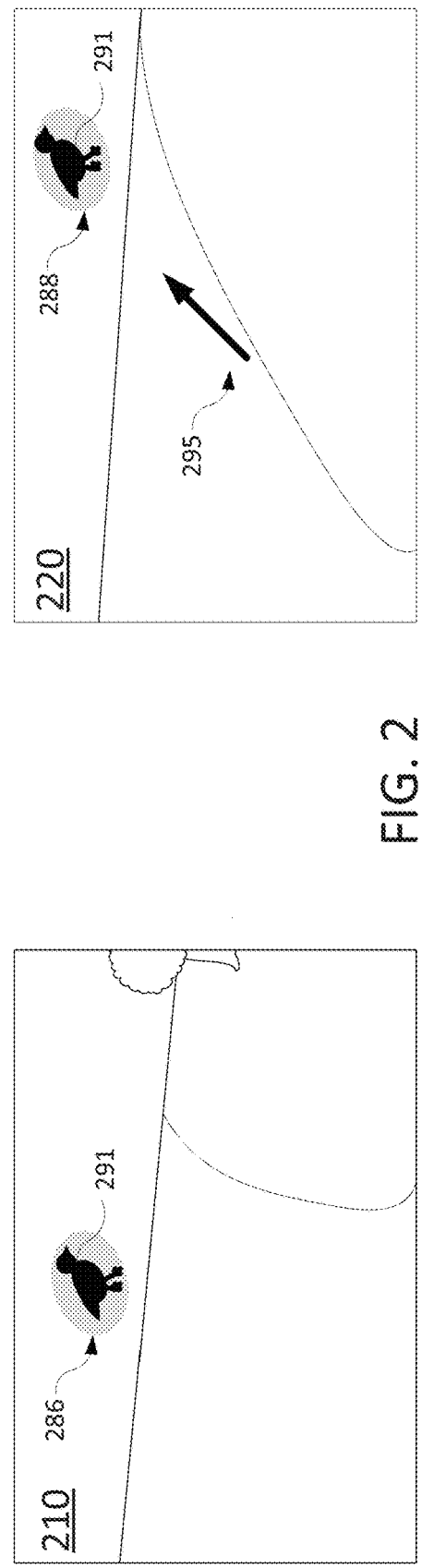
FIG. 2

COLLABORATIVE VISUAL ENHANCEMENT DEVICES

The present disclosure relates generally to visual enhancement devices, and more particularly to devices, computer-readable media, and methods for collaborative object detection.

BACKGROUND

Various devices are available to assist users in finding objects in an environment, such as binoculars, telescopes, and the like.

BRIEF DESCRIPTION OF THE DRAWINGS

The present disclosure can be readily understood by considering the following detailed description in conjunction with the accompanying drawings, in which:

FIG. 2 illustrates a pictorial representation of collaborative object detection, in accordance with the present disclosure;

To facilitate understanding, identical reference numerals have been used, where possible, to designate identical elements that are common to the figures.

DETAILED DESCRIPTION

Figure 1:
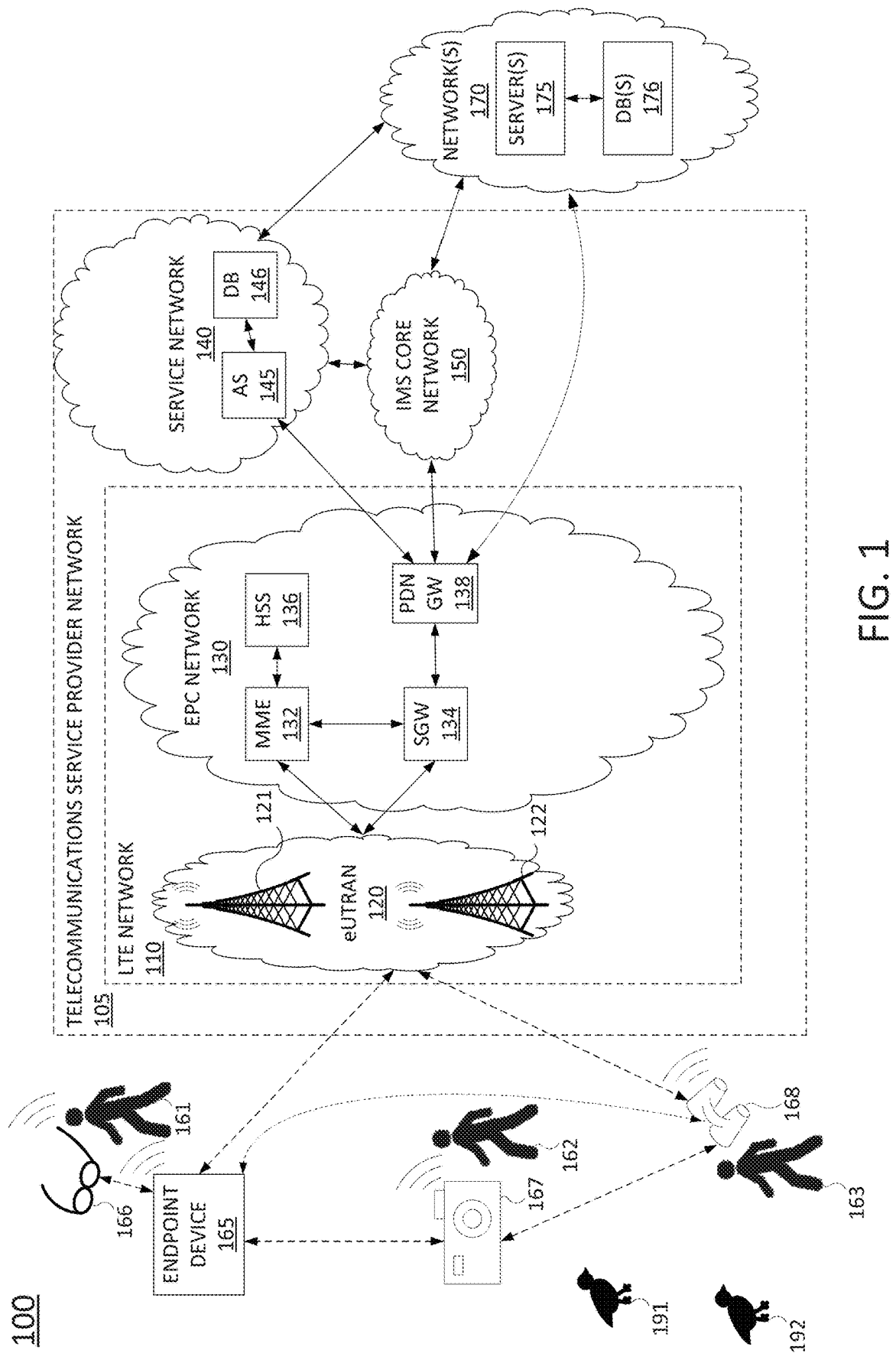
FIG. 1 illustrates an example of a system including a telecommunication service provider network, according to the present disclosure.

The present disclosure broadly discloses devices, non-transitory (i.e., tangible or physical) computer-readable storage media, and methods for collaborative object detection. For instance, in one example, a processing system including at least one processor may be implemented for detecting an object in a captured image, capturing features of the object, determining a location of the device, and determining a bearing from the device to the object. The processing system may further transmit the features of the object, the location of the device, and the bearing from the device to the object to a second device.

In another example, a processing system including at least one processor may receive, from a second device, features of an object, a location of the second device, and a bearing from the second device to the object. The processing system may further provide an assistance to orient the device to view the object using the features of the object, the location of the second device, and the bearing from the second device to the object.

Examples of the present disclosure relate to visual enhancement devices, such as binoculars, cameras, telescopes, smart glasses, and the like, equipped with computer vision and wireless networking components. In one example, computer vision and voice navigation components are used to identify, track, and share sighted objects. For example, computer vision components can be used to identify and segment content seen through a visual enhancement device. This may include segmenting a scene by color, object shape, distance, etc. Second, after identification of an object, the object's placement in the larger scene (e.g., a bird in a tree) can be tracked and stored, even if the visual enhancement device is moved to a different location or used in a different perspective. This capability allows the user to refocus on the target object (e.g., using stored object features or stored features of the scene around the object) even if the operator has shaky hands or if the visual enhancement device is pointed away temporarily. In addition to computer vision-based tracking, other sensors on the visual enhancement device (e.g., a compass, a gyroscope, depth sensors, etc.) can be used to assist in object detection.

In one example, an augmented reality (AR) component highlights a sited object with a halo, color change, borders, shading, etc., for one or more users of a same visual enhancement device. In addition, AR and/or voice navigation assistance may be provided via the visual enhancement device to direct the user to orient the visual enhancement device toward the object. For example, the visual enhancement device may present an arrow in a visual overlay over field of view pointing in the direction to turn towards the object. Similarly, in one example, a voice navigation component may assist a user to re-locate a sighted object, e.g., by giving directions to positionally navigate within a scene, such as "to the left," "above," etc.

Additionally, a collaboration and sharing component helps users share sighted objects with other devices (e.g., additional visual enhancement devices of other users). In one example, collaboration may use local (or distributed) network technology to share sighted objects (e.g., a bird), other features (e.g., the visuals around the bird), tracking data, and so forth among multiple visual enhancement devices (e.g., different binoculars, telescopes, cameras, etc.) so that proximal users nearby may use these findings. In one example, a group may be formed ad hoc, e.g., for a bird viewing trip. In one example, the visual enhancement devices may formulate a local network and may further negotiate sensor capabilities (azimuth measurements via compasses, elevation measurements via gyroscopes, etc.) to compute transformation matrices to translate one set of device coordinates to another set of device coordinates for a peer device (or to a reference coordinate system). In one example, devices tied to personal accounts may establish content upload paths (e.g., cloud drive(s)) for uploading images, videos, and/or metadata.

An illustrative example of collaborative object detection may proceed as follows. A visual enhancement device of a group leader may detect and highlight a bird with an AR halo. The visual enhancement device may then share location/coordinates, bearing information, and feature information of the object (the bird) to other visual enhancement devices. The other visual enhancement devices may receive the location/coordinates, bearing information, and feature information and proceed to highlight the bird when sighted via the respective devices. As different users move around, visual features are used to track the bird's location and movement relative to the scene. In one example, the visual features may represent a "fingerprint" of the object, and may comprise "strong" features that can be used to best and most easily identify the object in subsequent sightings. In addition, the bearings from one or more visual enhancement devices to the object at different locations may be recorded and shared. In one example, AR markers, such as arrows, may indicate which direction to turn for the bird. Similarly one of the users can let another user borrow a visual enhancement device, which will use the computer vision features to highlight the object for the new user. If the object is not in the field of view, location and bearing information from the device and/or from other devices may be used to re-locate the object. AR and/or voice navigation assistance may also be provided via the visual enhancement device to direct the user to orient the visual enhancement device toward the correct direction of the current location (or most recently detected location) of the object. These and other aspects of the present disclosure are discussed in greater detail below in connection with the examples of FIGS. 1-5.

FIG. 1 illustrates an example network, or system 100 that may implement or support examples of the present disclosure for collaborative object detection. In one example, the system 100 includes a telecommunications service provider network 105. The telecommunications service provider network 105 may comprise a Long Term Evolution (LTE) network 110, a service network 140, and a core network, e.g., an IP Multimedia Subsystem (IMS) core network 150. The system 100 may further include other networks 170 connected to the telecommunications service provider network 105. As shown in FIG. 1, the system 100 may connect endpoint device 165 and endpoint devices 166, 167, and 168 (broadly "collaborative visual enhancement devices") with devices, e.g., servers 175 in networks 170, with other endpoint devices (not shown) and/or with other components of telecommunication service provider network 105.

As illustrated in FIG. 1, endpoint device 165 and endpoint device 166 may be associated with user 161. Endpoint device 165 may comprise, for example, a cellular telephone, a smartphone, a tablet computing device, a laptop computer, a wireless enabled wristwatch, or any other wireless and/or cellular-capable mobile telephony and computing device (broadly, a "mobile endpoint device"). Endpoint device 166 may comprise, for example, a wearable computing device, such as a head-mounted smart camera, a pair of smart glasses, and so forth. As further illustrated in FIG. 1, endpoint device 167 may be associated with user 162 and may comprise a digital camera, while endpoint device 168 may be associated with user 163 and may comprise binoculars or telescopes. In one example, endpoint devices 165-168 may be equipped for non-cellular wireless communication. In another example, endpoint devices 165-168 may be equipped for cellular and non-cellular wireless communication. For instance, endpoint device 165-168 may include components which support peer-to-peer and/or short range wireless communications. Thus, each of the mobile endpoint devices 165-168 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth. In the example of FIG. 1, endpoint devices 165 and 168 may be equipped for cellular communication, and thus are illustrated as having connections to LTE network 110. In contrast, endpoint devices 166 and 167 may not have cellular communication capabilities, or may have such features disabled, and therefore are illustrated as having local connections to other endpoint devices. In one example, remote communications may still be sent to and received from endpoint devices 166 and 167 via endpoint device 165 and/or endpoint device 168, for example.

Endpoint devices 165-168 may be equipped with display screens, speakers, headsets, and the like for displaying and/or presenting communications, and for receiving inputs relating to such communications. In addition, endpoint devices 165-168 may be equipped with one or more cameras for capturing images (including still images and/or video) from an environment. For instance, endpoint device 166 may comprise smart glasses with an outward facing camera to capture images from a field of view in a direction that user 161 is looking. In one example, endpoint devices 165-168 may have augmented reality (AR) enhancement capabilities. For instance, endpoint device 166 may have a screen and a reflector to project outlining, highlighting, or other visual markers to the eye(s) of users 161 to be perceived in conjunction with the surroundings. In one example, endpoint device 168 (e.g., binoculars) may have a similar capability wherein a projector and reflector within one or both binocular scopes may place visual features within a field of view to be perceived by user 163 in conjunction with the magnified imagery of the surroundings received via the binoculars. In one example, device 167 (e.g., a digital camera) may also project outlining, highlighting, or other visual markers via a projection visible when using a viewfinder of the camera, or may overlay such visual markers via a screen which may represent the imagery of the scenery captured via the camera.

In one example, any one or more of endpoint devices 165-168 may include additional components, such as a Global Positioning System (GPS) unit, a gyroscope, and a compass. In addition, in one example, mobile endpoint devices 165-168 may comprise all or a portion of a computing device or system, such as computing system 500, and/or processing system 502 as described in connection with FIG. 5 below, specifically configured to perform various steps, functions, and/or operations for collaborative object detection, in accordance with the present disclosure.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the $3^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UE), such as endpoint device 165 and/or endpoint device 168, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G, 3G, and 5G wireless networks.

In addition, EPC (common backbone) network 130 may comprise a Home Subscriber Server (HSS) 136 that contains subscription-related information (e.g., subscriber (or "user") profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, service network 140 may comprise one or more devices for providing services to subscribers, customers, and or users. For example, telecommunications service provider network 105 may provide a cloud storage service, a web server hosting service, and other services. As such, service network 140 may represent aspects of telecommunications service provider network 105 where infrastructure for supporting such services may be deployed. In the example of FIG. 1, service network 140 may include an application server (AS) 145. In one example, AS 145 may comprise all or a portion of a computing device or system, such as computing system 500, and/or processing system 502 as described in connection with FIG. 5 below, specifically configured to perform various steps, functions, and/or operations for collaborative object detection, in accordance with the present disclosure. In one example, service network 140 may also include a database (DB) 146, e.g., a physical storage device integrated with AS 145 (e.g., a database server), or attached or coupled to the AS 145, to store various types of information in support of systems for collaborative object detection, in accordance with the present disclosure. For example, DB 146 may store an image salience model (or underlying data for an image salience model) that may be applied by AS 145, or provided to endpoint devices requesting an image salience model from AS 145. In accordance with the present disclosure, an image salience model may use database of object types relating to a theme, e.g., "birds." In one example, DB 146 may store object types for a variety of different themes, such as "fish," "trees," etc. In one example, DB 146 may alternatively or additionally store object features that are captured via endpoint devices (such as endpoint devices 165-168) and uploaded to AS 145. In such an example, AS 145 may also retrieve object features for captured objects and provide the object features to requesting devices, e.g., endpoint devices other than the endpoint device(s) initially uploading the object features. In one example, AS 145 may perform object detection and recognition in accordance with data stored in database 146. In addition, in one example, AS 145 may retrieve information regarding an object (or a type of the object) from another device (such as one of server(s) 175 via network(s) 170 (e.g., via the Internet in general).

Figure 5:
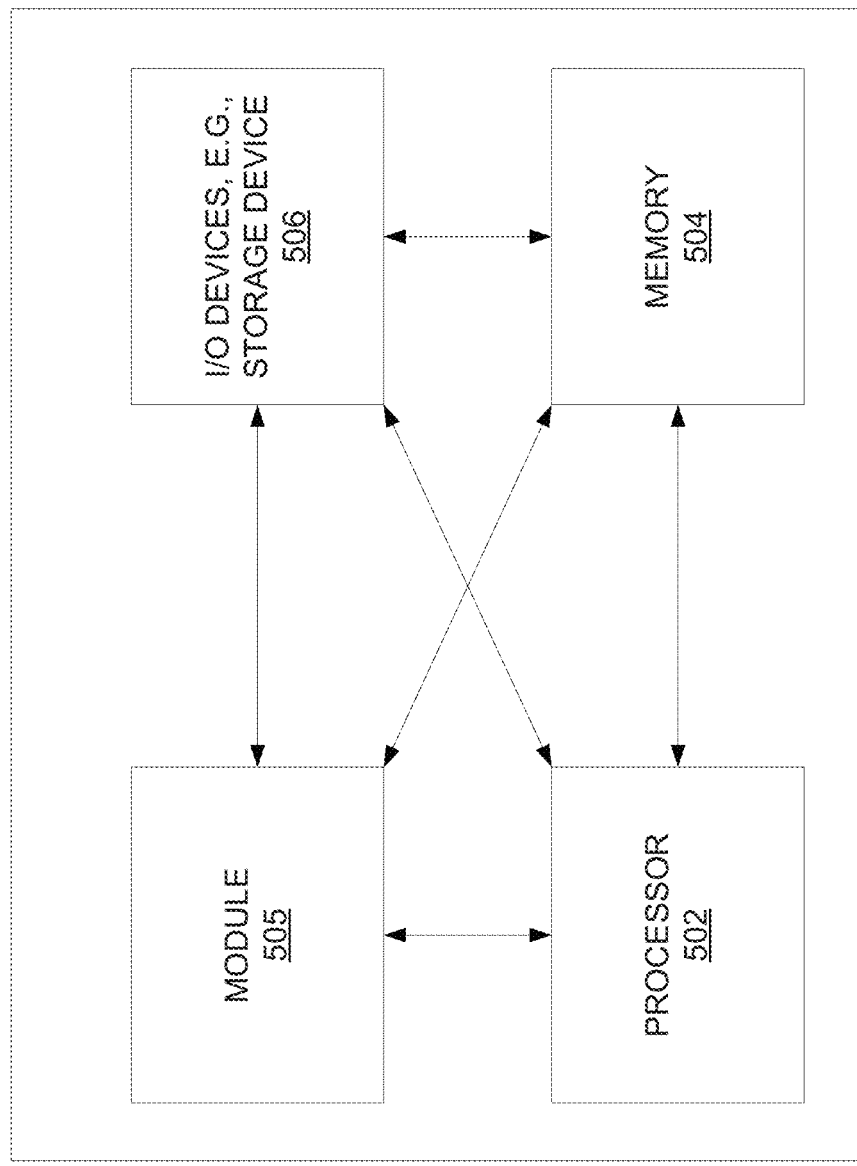
FIG. 5 illustrates a high-level block diagram of a computing device specially programmed to perform the functions described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. As illustrated in FIG. 1, networks 170 include one or more servers 175 which may each comprise all or a portion of a computing device or system, such as computing system 500, and/or processing system 502 as described in connection with FIG. 5 below, specifically configured to perform various steps, functions, and/or operations for collaborative object detection, in accordance with the present disclosure. In one example, networks 170 may also include one or more databases (DBs) 176, e.g., physical storage devices integrated with server(s) 175 (e.g., a database server), or attached or coupled to the server(s) 175, to store various types of information in support of systems for collaborative object detection, in accordance with the present disclosure. As just one example, DB(s) 176 may store reference information regarding various objects that may be detected, such as information regarding different bird species. In one example, endpoint devices 165 and 168 may be connected to the one or more servers 175 via PDN GW 138, and/or via PDN GW 138 and IMS core network 150. In this regard, it should be noted that various functions that may be performed by AS 145 may alternatively or additionally be performed by the one or more of servers 175, and vice versa.

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, service network 140, and IMS core network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 111 and 112, PDN GW 138, AS 145, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, a 5G network and the like, an IEEE 802.11-based network, or a future technology or standard-based network, a network implementing various combinations of any one or more of the foregoing technologies, and so on). In one example, AS 145, DB 146, servers 175 and/or DBs 176 may comprise cloud-based and/or distributed data storage and/or processing systems comprising one or more servers at a same location or at different locations. However, for ease of illustration, these components are depicted as standalone devices in FIG. 1. In addition, although the AS 145 and DB 146 are illustrated as components of service network 140, in other examples, any one or more of these components may be deployed in a different configuration, such as in LTE network 110, IMS network 150, and so forth. Thus, these and other modifications are all contemplated within the scope of the present disclosure.

To aid in understanding the present disclosure, FIG. 2 illustrates a pictorial representation of an example 200 for collaborative object detection, in accordance with the present disclosure. As shown in FIG. 2, two users may be engaged in viewing an environment 205 via endpoint devices 267 and 268, respectively, where the environment 205 may include at least one object of interest, e.g., a bird 291. In the present example, a user may orient endpoint device 267 toward bird 291 to view the bird 291. The field of view 210 may represent what the user sees through endpoint device 267 when the endpoint device 267 is so oriented.

In one example, the endpoint device 267 may automatically highlight objects of interest. For example, the endpoint device 267 may include a charge coupled device (CCD) image sensor for capturing a digital image from the environment 205. The bird 291 may then be determined to be an object of interest from the digital image using image salience detection processes, (e.g., applying an image salience model) and then performing an image recognition algorithm over the "salient" portion of the image(s). The bird 291 may then be highlighted with halo 286 to indicate that it may be an object of interest. In one example (not shown in FIG. 2), multiple potential objects of interest may be detected and highlighted, from which the user of endpoint device 267 may select one as the object of interest. In such case, the highlighting may remain for the object of interest, while the highlighting may be dropped for the other potential objects of interest.

In one example, endpoint device 267 may capture features of the object of interest. For example, regarding bird 291, endpoint device 267 may capture measurements of color, e.g., RGB (red-green-blue) or CYM (cyan-yellow-magenta) raw data (luminance values) from a CCD/photo-sensor array, length and width measurements or estimates, a length to width ratio, and so forth. In one example, the endpoint device 267 may store the measured properties of the bird 291 for future use and/or for sharing with other devices, as described in greater detail below. In addition, in one example, endpoint device 267 may also capture and share secondary visual data, such as other aspects of the environment, e.g., nearby objects, sky, water, grass backdrop, etc., to supplement primary visual data relating to the bird 291.

In one example, endpoint device 267 may compare the features of bird 291 captured from the digital image with an object model, or one or more object models relating to a theme (e.g., "birds"). For instance, the endpoint device 267 may attempt to determine whether the object of interest is a bird (e.g., as compared to other types of objects), to determine a type of the bird 291 (from among a plurality of different possible types of birds), and so forth. In one example, the object model is associated with a hyper-dimensional space that is representative of physical properties of an object. For instance, the object model may comprise a discriminator. The discriminator may comprise a machine learning model that determines whether new data is or is not part of a class represented by training data; in this case the captured measurements/properties of bird 291. In one example, the discriminator is a neural network, e.g., a deep neural network (DNN). In other examples, the discriminator may comprise a different type of machine learning model, such as a SVM-based classifier, a distance-based classifier, or the like, or a non-classifier type machine learning model, such as a decision tree, a k-nearest neighbor (KNN) predictive model, and so forth. The updating (and creation) of the object model can utilize supervised, unsupervised, or semi-supervised learning (partially labeled data).

In the present example, endpoint device 267 may have an orientation as illustrated with respect to local coordinate system 282 containing axis (x, y, z). In one example, endpoint device 267 may determine the orientation using a gyroscope and compass of the endpoint device 267. In one example, the endpoint device 267 may translate the orientation in the local coordinate system 282 into an orientation in a global coordinate system. For instance, the endpoint device 267 may calculate an offset from the orientation in the local coordinate system 282 to a direction of an object of interest, e.g., bird 291. Endpoint device 267 may then translate an orientation toward bird 291 in the local coordinate system 282 into an orientation in a global coordinate system.

In one example, the range (distance) from endpoint device 267 to an object of interest (e.g., bird 291) may be determined from a focus of the endpoint device 267. For instance, zoom and focus settings may indicate the approximate distance at which the image of the field of view 210 is placed in focus. In one example, the zoom and focus settings may be manually set by the user. However, the endpoint device 267 may calculate the distance based upon the settings of the zoom and/or focus controls. In one example, endpoint device 267 may further determine a location of endpoint device 267 via a GPS unit of endpoint device 267. Alternatively, or in addition, endpoint device 267 may derive the location using other location estimation methods, such as cell identifier (cell ID) based methods, observed time difference of arrival (OTDA) techniques, or barycentric triangulation (e.g., where endpoint device 267 may be equipped for cellular communications).

In one example, endpoint device 267 may store the location, orientation, and/or range, as well as the captured features of bird 291 for assisting in locating bird 291 for subsequent viewings via endpoint device 267. In one example, endpoint device 267 may store the device orientation information with respect to local coordinate system 282, or may store the device orientation information as well as the object offset with respect to a global coordinate system. For instance, the user of endpoint device 267 may put endpoint device 267 down for a moment, or may point the endpoint device 267 away from bird 291. Subsequently, the user may wish to again view bird 291, but may not be able to easily locate bird 291. Accordingly, in one example, endpoint device 267 may provide visual instructions, e.g., a visual overlay in field of view 210 to help the user to correctly orient endpoint device 267 toward the last known position of bird 291. It should be noted that the orientation of endpoint device 267 as well as the location of endpoint device 267 may have changed. Accordingly, in one example, endpoint device 267 may calculate a change in orientation from the current position and orientation of endpoint device 267 to place the endpoint device 267 in the correct orientation towards the last known position of bird 291.

In one example, endpoint device 267 may share the location, orientation, and/or range, as well as the captured features of bird 291 for assisting in locating bird 291 via endpoint device 268 (and/or one or more other endpoint devices). In one example, the location, orientation, and/or range, as well as the captured features of bird 291 may be shared via peer-to-peer or ad hoc wireless network-based communication. In another example, the location, orientation, and/or range, as well as the captured features of bird 291 may be shared via a network based-server (e.g., a server deployed in a cellular network or accessible via a cellular network). In accordance with the present disclosure, endpoint device 268 may then use the location, orientation, and/or range of endpoint device 267 and information regarding the location of endpoint device 268 to calculate a change in orientation from the current position and orientation of endpoint device 268 to place the endpoint device 268 in the correct orientation towards the last known position of bird 291. In the present example, endpoint device 268 may also have a gyroscope and compass to enable endpoint device 268 to calculate a local orientation 284 containing axis (u, v, w). In other words, endpoint device 268 may have an awareness of the orientation of endpoint device 268 relative to a global (reference) coordinate system and may then calculate a change in orientation from the current position and orientation of endpoint device 268 to place the endpoint device 268 in the correct orientation towards the last known position of bird 291. In one example, where range information in not available, endpoint device 268 may estimate the range and utilize a midpoint of the estimated range to infer the approximate location of bird 291. For example, it may be assumed that all ranges are a minimum of 15 feet, 20 feet, etc., where presumably no visual enhancement device would be used in any lesser range. Similarly, a maximum range may be assumed based upon the particular topic/theme, the size(s) of the object(s) that are anticipated to be detected, the zoom/magnification capabilities of the visual enhancement device, and so forth. For example, the user may be observing hummingbirds in one scenario and elephants in another. Thus, the maximum ranges may be different even when using the same device.

In one example, endpoint device 268 may provide assistance to a user in orienting the device 268 to locate the object of interest (e.g., bird 291). To illustrate, endpoint device 268 may present an arrow 295 as a visual overlay over field of view 220 to help a user to center the field of view 220 at the last known location of the object of interest (e.g., bird 291). The endpoint device 268 may similarly overlay highlighting 288 over the bird 291 when the bird 291 is detected in the field of view 220. For example, endpoint device 268 may also include a CCD/photo-sensor array and may capture a digital image of the field of view 220. In one example, endpoint device 268 may then examine the properties of the digital image and compare regions of the image to the captured features of bird 291 that are received from endpoint device 267.

For instance, endpoint device 268 may capture measurements of color, e.g., RGB (red-green-blue) or CYM (cyan-yellow-magenta) raw data (luminance values). Endpoint device may also utilize an image salience detection process to first analyze regions of the digital image that may be most likely to contain the object of interest. In this regard, endpoint device 268 may obtain length and width measurements or estimates, a length to width ratio, and so forth regarding regions of the digital image that may contain the object of interest (e.g., bird 291). In one example, the image salience model may be the same or substantially similar as that which may be utilized by endpoint device 267 as described above. When the bird 291 is detected within the field of view 220, the bird 291 may be identified with overlay highlighting 288. In addition, the arrow 295 may be updated to indicate the actual direction of bird 291 relative to the center of the field of view 220.

In one example, endpoint device 268 may capture additional features of the bird 291. For instance, endpoint device 267 may capture features of bird 291 from one vantage point, whereas endpoint device 268 may capture the additional features from a different vantage point which may reveal aspects of the bird 291 not visible to endpoint device 267. Accordingly, endpoint device 268 may also convey these features to endpoint device 267 and/or other devices for use in further assistance in detecting the bird 291. Endpoint device 268 may further include a location of endpoint device 268, an orientation from the location to the bird 291 with respect to a global coordinate system, a range to the bird 291, and so forth to assist other devices or other users, or another user of endpoint device 268 to locate the bird 291.

It should be noted that FIG. 2 is provided as just one example of how two or more endpoint devices may participate in collaborative object detection in accordance with the present disclosure. Accordingly, it should be appreciated that in one example, endpoint devices 267 and 268 may communicate via an external network (e.g., a cellular network). In another example, more or less information may be collected and shared between endpoint devices 267 and 268. For instance, many observing situations may involve views towards the horizon. As such, elevation information may be less relevant to a peer device than compass bearing information in assisting to locate an object. Alternatively, or in addition, a device may not have a gyroscope, so it may indicate to other devices that it requires richer visual data (e.g., more than might otherwise be collected and/or sent, where the other devices have more capabilities to rely upon orientation data and use their own gyroscopes). Thus, these and other modifications are all contemplated within the scope of the present disclosure.

Figure 3:
FIG. 3 illustrates an example flowchart of a method for collaborative object detection, in accordance with the present disclosure.

FIG. 3 illustrates a flowchart of an example method 300 for collaborative object detection, in accordance with the present disclosure. In one example, steps, functions and/or operations of the method 300 may be performed by a device as illustrated in FIG. 1, e.g., one of endpoint devices 165-168, or any one or more components thereof, such as a processing system, a processing system in conjunction with a GPS unit, a gyroscope, a compass, a CCD/photo-sensor array, a wireless transceiver, a projector and/or a display screen, and so forth. Alternatively, or in addition, the steps, functions and/or operations of the method 300 may be performed by a processing system collectively comprising a plurality of devices as illustrated in FIG. 1, such as application server 145, server(s) 175, one or more of endpoint devices 165-168, and so forth. In one example, the steps, functions, or operations of method 300 may be performed by a computing device or system 500, and/or a processing system 502 as described in connection with FIG. 5 below. For instance, the computing device 500 may represent at least a portion of an endpoint device, a server, an application server, and so forth in accordance with the present disclosure. For illustrative purposes, the method 300 is described in greater detail below in connection with an example performed by a processing system, such as processing system 502. The method 300 begins in step 305 and proceeds to step 310.

At step 310, the processing system (e.g., a collaborative visual enhancement device) detects an object in a captured image. For example, the collaborative visual enhancement device may comprise a digital camera, smart binoculars, smart glasses, a telescope, or the like. The device may further include: a camera, a GPS unit, a gyroscope, and a compass. In one example, the captured image is obtained via the camera, e.g., a digital camera comprising a CCD/photosensor array.

In one example, step 310 may include applying an image salience model to the captured image, or a set of video frames and/or a series of captured images including the captured image. In one example, step 310 may include finding multiple objects of relevance from "salient" portions of the image, prompting a user to select one of the objects, and then capturing features of that object. In one example, the image salience model may be specific to a theme or topic, e.g., birds. Thus, portions of an image with bird-related features may be given greater emphasis in the weighting of the image salience model.

In one example, the detecting the object may be in accordance with a topical database of object types relating to a theme, where each object type comprises a plurality of features which are characteristic of the object type. For example, a recognition model may be applied that is specific to different types of birds, mammals, trees, and so forth. In one example, a model for a particular theme is selected to be active and utilized based upon at least one of: a selection by the user, a time, or a location.

At step 315, the processing system captures features of the object. To illustrate, the processing system may extract features from the captured image and match the extracted features to the features of an object type of the object in the database. The features may comprise, for instance, measurements of color, brightness, length and width measurements or estimates, a length to width ratio, and so forth.

At step 320, the processing system determines a location of the device. For example, the location may be determined via a GPS unit of the device or using other location estimation methods, such as cell ID based methods, OTDA techniques, or barycentric triangulation. In one example, the processing system may determine a location based upon location measurements of another device (such as binoculars determining a location from a cellular telephone paired via IEEE 802.15 based communications (e.g., Bluetooth)).

At step 325, the processing system determines a bearing from the device to the object. For example, the bearing from the device to the object may be calculated based upon measurements from a gyroscope and/or a compass of the device. In one example, the bearing may comprise an azimuth and an elevation. In another example, the bearing may omit elevation information. For instance, many observing situations may involve views towards the horizon. As such, elevation information may be less relevant than compass bearing information to locate an object. In such case, the device may not include a gyroscope, or may decline to collect and/or share elevation measurements obtained from a gyroscope.

At step 330, the processing system determines a range to the object. For instance, zoom and focus settings of the device may indicate to the processing system the approximate distance at which the object is placed in focus.

At step 335, the processing system transmits to a second device: the features of the object, the location of the device, and the bearing from the device to the object. In one example, the transmitting further comprises transmitting the range to the object that may be determined at step 330.

At step 340, the processing system identifies the object, or a type of the object. For instance, the processing system may compare features of the object captured from the digital image with an object model, or one or more object models relating to a theme (e.g., "birds"). For instance, step 340 may include determining whether the object of interest is a bird (e.g., as compared to other types of objects), determining a type of a bird (from among a plurality of different possible types of birds), and so forth. In one example, an object model is associated with a hyper-dimensional space that is representative of physical properties of an object. For instance, the object model may comprise a discriminator. The discriminator may comprise a machine learning model that determines whether new data is or is not part of a class represented by training data; in this case the captured measurements/properties of the object (e.g., a bird).

It should be noted that in contrast to step 340, step 315 may collect features that are useable to distinguish the object from other objects or to separate the object from other aspects of captured digital images, without having a richer awareness of the actual type of object.

At step 345, the processing system receives information about the object from a network-based data source. For instance, the processing system may identify a type of the object, such as a specific species of bird, and may then request information from a network based server regarding the species of bird.

At step 350, the processing system presents the information via the device. For instance, the processing system may present the information in an audio format via a speaker or a headset of the device or of a paired device. Alternatively, or in addition, the processing system may present the information via a display screen, via a projection and/or a visual overlay, and so forth.

At step 355, the processing system stores at the device the features of the object, the location of the device, and the bearing from the device to the object. For instance, such information may be used to provide assistance in subsequent viewings of the same object via the same device.

At step 360, the processing system provides an assistance to reorient the device to view the object using the features of the object, the location of the device, and the bearing from the device to the object. In one example, the location comprises a first location of the device and the bearing comprises a first bearing to the object. Accordingly, step 360 may include detecting a second location of the device and calculating a new bearing from the device to the object based upon the second location, the first location, and the first bearing. Step 360 may further include providing an instruction to a user to orient the device in accordance with the new bearing. The instruction may comprise audio instructions, instructions on a display screen, and/or visual overlay instructions. In one example, the processing system may also provide a visual and/or an audio instruction to the user to adjust a zoom setting of the device in accordance with a range to the object, or may provide such information in a same instruction as the instruction to orient the device.

In one example, step 360 may further include capturing a subsequent image when the device is oriented in accordance with the new bearing, detecting the object in the subsequent image, and directing the user to the object. For instance, the user may be directed to the object by highlighting the object with a visual overlay or providing a further instruction to the user to center the object within a field of view of the device. In one example, the further instruction may comprise audio instructions, instructions on a display screen, and/or visual overlay instructions. At step 395, the method 300 ends.

It should be noted that the method 300 may be expanded to include additional steps or may be modified to include additional operations with respect to the steps outlined above. For instance, in one example the operations of the method 300 may further include: capturing a new set of features of the object via the subsequent image, recalculating a bearing from the device to the object, and transmitting the new set of features, the second location of the device, and/or the new bearing from the device to the object to the second device and/or to at least one additional device. Similarly, the operations of the method 300 may further include calculating a new range to the object at the second location. In one example, the storing may further include storing the range to the object, and the calculating the new bearing from the device to the object may be further based upon the range to the object. Thus, the method 300 may be repeated through various cycles of moving the device among locations, transmitting object features, locations, and bearings to other devices, assisting a user to reorient the device to view an object, and so forth. In one example, the method 300 may be expanded to include aggregating captured features of an object from different vantages, storing and/or transmitting such aggregated features, detecting the object in subsequently captured images at a same device or at a different device, and so forth. Thus, these and other modifications are all contemplated within the scope of the present disclosure.

Figure 4:
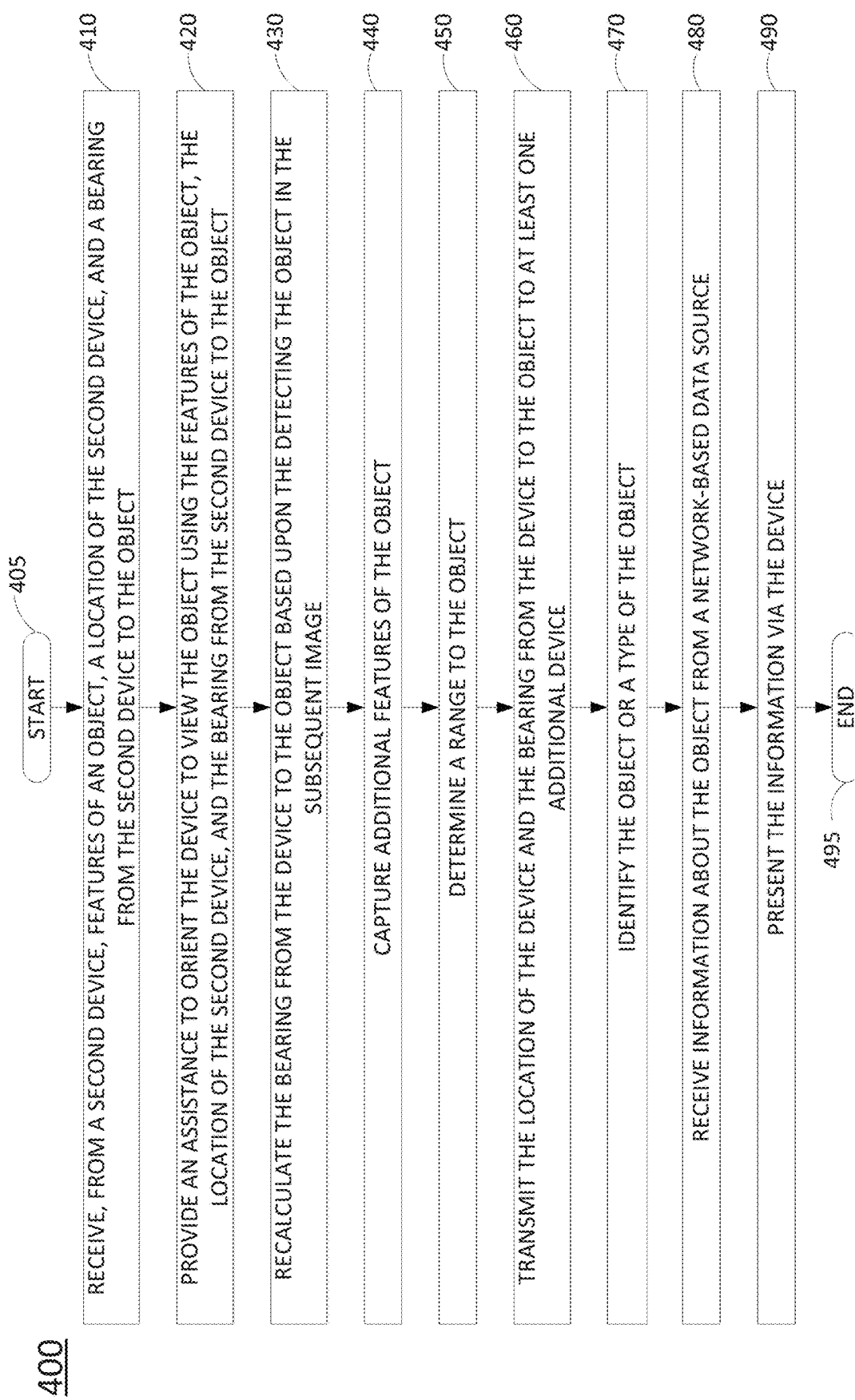
FIG. 4 illustrates an example flowchart of an additional method for collaborative object detection, in accordance with the present disclosure.

FIG. 4 illustrates a flowchart of an example method 400 for collaborative object detection, in accordance with the present disclosure. In one example, steps, functions and/or operations of the method 400 may be performed by a device as illustrated in FIG. 1, e.g., one of endpoint devices 165-168, or any one or more components thereof, such as a processing system, a processing system in conjunction with a GPS unit, a gyroscope, a compass, a CCD/photo-sensor array, a wireless transceiver, a projector and/or a display screen, and so forth. Alternatively, or in addition, the steps, functions and/or operations of the method 300 may be performed by a processing system collectively comprising a plurality of devices as illustrated in FIG. 1, such as application server 145, server(s) 175, one or more of endpoint devices 165-168, and so forth. In one example, the steps, functions, or operations of method 400 may be performed by a computing device or system 500, and/or a processing system 502 as described in connection with FIG. 5 below. For instance, the computing device 500 may represent at least a portion of an endpoint device, a server, an application server, and so forth in accordance with the present disclosure. For illustrative purposes, the method 400 is described in greater detail below in connection with an example performed by a processing system, such as processing system 502. The method 400 begins in step 405 and proceeds to step 410.

At step 410, the processing system receives, from a second device, features of an object, a location of the second device, and a bearing from the second device to the object. In one example, the receiving further includes receiving a range from the second device to the object. In one example, the second device may collect and transmit such information in accordance with steps 310-335 of the method 300 described above.

At step 420, the processing system provides an assistance to orient the device to view the object using the features of the object, the location of the second device, and the bearing from the second device to the object. In one example, step 420 includes detecting a location of the device (e.g., the device of the processing system performing the method), calculating a bearing from the device to the object based upon the location of the device, the location of the second device, and the bearing of the second device to the object, and providing an instruction to a user to orient the device in accordance with the bearing from the device to the object. In one example, the calculating the bearing from the device to the object is further based upon the range from the second device to the object. In one example, the processing system may also provide a visual or audio instruction to the user to adjust a zoom setting of the device in accordance with a range to the object, or may provide such information in a same instruction as the instruction to orient the device. In one example, step 420 may further include: capturing a subsequent image when the device is oriented in accordance with the new bearing, detecting the object in the subsequent image, and directing the user to the object. For instance, the user may be directed to the object by highlighting the object with a visual overlay or providing a further instruction to the user to center the object within a field of view of the device. In one example, the further instruction may comprise audio instructions, instructions on a display screen, and/or visual overlay instructions. In one example, the detecting the object in the subsequent image is based upon the features of the object received from the second device. In one example, the detecting the object may be further based upon inferred features of the object from a network based server, or a locally stored database of object types.

At step 430, the processing system recalculates the bearing from the device to the object based upon the detecting the object in the subsequent image. For example, the user may orient the device in accordance with instruction(s) provided at step 420. However, the object may be detected in a portion of the image that is not centered in a field of view of the device. Thus, the current bearing to the object may be different from the bearing as calculated based upon a location of the object determined at step 420 using the information received at step 410.

At step 440, the processing system captures additional features of the object. For instance, step 440 may comprise the same or substantially similar operations as step 315 of the method 300 discussed above.

At step 450, the processing system determines a range to the object. For instance, step 450 may comprise the same or substantially similar operations as step 330 of the method 300 discussed above.

At step 460, the processing system transmits the location of the device and the bearing from the device to the object to at least one additional device. In one example, the at least one additional device comprises a peer device, or a network-based server for aggregating and storing features of the object. In one example, the transmitting further comprises transmitting the additional features of the object that may be captured at step 440. In one example, the transmitting further comprises transmitting the range to the object that may be determined at step 450.

At step 470, the processing system identifies the object or a type of the object. For instance, step 470 may comprise the same or substantially similar operations as step 340 of the method 300 discussed above.

At step 480, the processing system receives information about the object from a network-based data source. For instance, step 480 may comprise the same or substantially similar operations as step 345 of the method 300 discussed above.

At step 490, the processing system presents the information via the device. For instance, step 490 may comprise the same or substantially similar operations as step 350 of the method 300 discussed above. At step 495, the method 400 ends.

It should be noted that the method 400 may be expanded to include additional steps or may be modified to include additional operations with respect to the steps outlined above. For instance, the method 400 may be repeated through various cycles of moving the device among locations, receiving object features, locations, and bearings from one or more other devices, transmitting object features, locations, and bearings to other devices, assisting a user to reorient the device to view an object, and so forth. In one example, the method 400 may be expanded to include aggregating captured features of an object from different vantages, storing and/or transmitting such aggregated features, detecting the object in subsequently captured images at a same device or at a different device, and so forth. Thus, these and other modifications are all contemplated within the scope of the present disclosure.

In addition, although not specifically specified, one or more steps, functions or operations of the method 300 or the method 400 may include a storing, displaying and/or outputting step as required for a particular application. In other words, any data, records, fields, and/or intermediate results discussed in the method 300 or the method 400 can be stored, displayed and/or outputted either on the device executing the method 300 or the method 400, or to another device, as required for a particular application. Furthermore, steps, blocks, functions, or operations in FIGS. 3 and 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 or method 400 may comprise optional steps, or can be combined, separated, and/or performed in a different order from that described above, without departing from the examples of the present disclosure.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for collaborative object detection, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 506 may also include antenna elements, transceivers, power units, and so forth. Although only one processor element is shown, it should be noted that the computing device may employ a plurality of processor elements. Furthermore, although only one computing device is shown in the figure, if the method 300 or the method 400 as discussed above is implemented in a distributed or parallel manner for a particular illustrative example, i.e., the steps of the above method 300 or method 400, or the entire method 300 or method 400 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300 or method 400. In one example, instructions and data for the present module or process 505 for collaborative object detection (e.g., a software program comprising computer-executable instructions) can be loaded into memory 504 and executed by hardware processor element 502 to implement the steps, functions, or operations as discussed above in connection with the illustrative method 300 or method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for collaborative object detection (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A first device comprising:
a processing system including at least one processor; and
a computer-readable medium storing instructions which, when executed by the processing system, cause the processing system to perform operations, the operations comprising:
  detecting an object in a captured image;
  capturing features of the object;
  determining a location of the first device;
  determining a bearing from the first device to the object;
  transmitting the features of the object, the location of the first device, and the bearing from the first device to the object to a second device;
  storing the features of the object, the location of the first device, and the bearing from the first device to the object; and
  providing an assistance to reorient the first device to view the object using the features of the object, the location of the first device, and the bearing from the first device to the object.

2. The first device of claim 1, wherein the location comprises a first location of the first device, wherein the bearing comprises a first bearing to the object, wherein the providing the assistance comprises:
  detecting a second location of the first device;
  calculating a new bearing from the first device to the object based upon the second location, the first location, and the first bearing; and
  providing an instruction to a user to orient the first device in accordance with the new bearing.

3. The first device of claim 2, wherein the providing assistance further comprises:
  capturing a subsequent image when the first device is oriented in accordance with the new bearing;
  detecting the object in the subsequent image; and
  directing the user to the object.

4. The first device of claim 3, wherein the directing the user to the object comprises:
  highlighting the object with a visual overlay; or
  providing a further instruction to the user to center the object within a field of view of the first device.

5. The first device of claim 4, wherein the instruction and the further instruction comprise:
  audio instructions; or
  visual overlay instructions.

6. The first device of claim 1, wherein the operations further comprise:
  determining a range to the object, wherein the transmitting further comprises transmitting the range to the object.

7. The first device of claim 1, wherein the operations further comprise:
  identifying the object or a type of the object;
  receiving information about the object from a network-based data source; and
  presenting the information via the first device.

8. The first device of claim 1, wherein the detecting the object comprises:
  applying an image salience model to the captured image.

9. The first device of claim 1, further comprising:
  a camera, wherein the captured image is obtained via the camera;
  a global positioning system unit, wherein the determining the location is via the global positioning system unit;
  a gyroscope; and
  a compass, wherein the determining the bearing from the first device to the object is based upon measurements from the gyroscope and the compass.

10. A first device comprising:
a processing system including at least one processor; and
a computer-readable medium storing instructions which, when executed by the processing system, cause the processing system to perform operations, the operations comprising:
  receiving, from a second device, features of an object, a location of the second device, and a bearing from the second device to the object; and
  providing an assistance to orient the first device to view the object using the features of the object, the location of the second device, and the bearing from the second device to the object.

11. The first device of claim 10, wherein the providing the assistance comprises:
  detecting a location of the first device;
  calculating a bearing from the first device to the object based upon the location of the first device, the location of the second device, and the bearing of the second device to the object; and
  providing an instruction to a user to orient the first device in accordance with the bearing from the first device to the object.

12. The first device of claim 11, wherein the providing assistance further comprises:
  capturing a subsequent image when the first device is oriented in accordance with the new bearing;
  detecting the object in the subsequent image; and
  directing the user to the object.

13. The first device of claim 12, wherein the operations further comprise:
  recalculating the bearing from the first device to the object based upon the detecting the object in the subsequent image; and
  transmitting the location of the first device and the bearing from the first device to the object to at least one additional device.

14. The first device of claim 13, wherein the operations further comprise:
  capturing additional features of the object, wherein the transmitting further comprises transmitting the additional features of the object.

15. The first device of claim 13, wherein the operations further comprise:
  determining a range to the object, wherein the transmitting further comprises transmitting the range to the object.

16. The first device of claim 12, wherein the directing the user to the object comprises:
  highlighting the object with a visual overlay; or
  providing a further instruction to the user to center the object within a field of view of the first device.

17. The first device of claim 16, wherein the instruction and the further instruction comprise:
  audio instructions; or
  visual overlay instructions.

18. The first device of claim 10, wherein the operations further comprise:
  identifying the object or a type of the object;
  receiving information about the object from a network-based data source; and
  presenting the information via the device.

19. A method comprising:
- detecting, by a processing system including at least one processor of a first device, an object in a captured image;
- capturing, by the processing system, features of the object;
- determining, by the processing system, a location of the first device;
- determining, by the processing system, a bearing from the first device to the object;
- transmitting, by the processing system, the features of the object, the location of the first device, and the bearing from the first device to the object to a second device;
- storing, by the processing system, the features of the object, the location of the first device, and the bearing from the first device to the object; and
- providing, by the processing system, an assistance to reorient the first device to view the object using the features of the object, the location of the first device, and the bearing from the first device to the object.

20. The method of claim 19, wherein the location comprises a first location of the first device, wherein the bearing comprises a first bearing to the object, wherein the providing the assistance comprises:
- detecting a second location of the first device;
- calculating a new bearing from the first device to the object based upon the second location, the first location, and the first bearing; and
- providing an instruction to a user to orient the first device in accordance with the new bearing.

* * * * *